United States Patent
Toporski

(10) Patent No.: US 7,526,254 B2
(45) Date of Patent: Apr. 28, 2009

(54) DIGITAL RADIO FRONT END WITH MINIMIZED IF SIGNAL PATH

(75) Inventor: Todd A. Toporski, Northville, MI (US)

(73) Assignee: Texas Instruments Incorporated, Dallas, TX (US)

( * ) Notice: Subject to any disclaimer, the term of this patent is extended or adjusted under 35 U.S.C. 154(b) by 309 days.

(21) Appl. No.: 11/087,374

(22) Filed: Mar. 23, 2005

(65) Prior Publication Data
US 2005/0215213 A1    Sep. 29, 2005

Related U.S. Application Data

(60) Provisional application No. 60/555,506, filed on Mar. 23, 2004.

(51) Int. Cl.
*H04B 7/00* (2006.01)
*H04Q 7/20* (2006.01)

(52) U.S. Cl. .................................. 455/45; 455/306

(58) Field of Classification Search ............ 455/553.1, 455/45, 168.1, 303, 306, 552.1
See application file for complete search history.

(56) References Cited

U.S. PATENT DOCUMENTS

| | | | | |
|---|---|---|---|---|
| 5,926,513 A | * | 7/1999 | Suominen et al. | 375/346 |
| 6,639,537 B1 | * | 10/2003 | Raz | 341/155 |
| 2004/0162048 A1 | * | 8/2004 | Milbar et al. | 455/266 |

* cited by examiner

*Primary Examiner*—Lee Nguyen
(74) *Attorney, Agent, or Firm*—Mirna Abyad; Wade J. Brady, III; Frederick J. Telecky, Jr.

(57) ABSTRACT

A digital down converter (DDC) can be provided in a digital radio receiver front end to produce baseband I and Q signals using mixing, decimating and narrow and wide filtering dependent upon the nature of the signals. After receiving a single wide IF signal from the IF tuner, a single IF ADC converts the IF signal to digital form, and the DDC generates wide and narrow baseband I and Q signals for digital signal processing. The DDC passes wide baseband I and Q signals to a digital baseband processor, while narrow baseband I and Q signals are passed to the analog baseband processor. The system and method of the present invention permits more accurate filtering of the respective digital and analog signals, while reducing receiver complexity and cost. An analog filter in the digital radio tuner can have relaxed specifications permitted by the DDC according to the present invention.

19 Claims, 4 Drawing Sheets

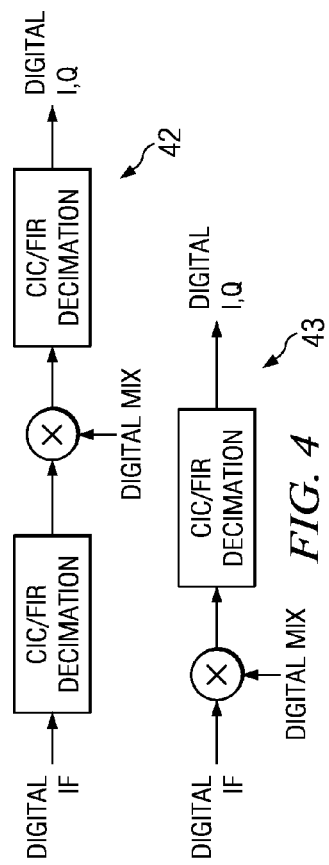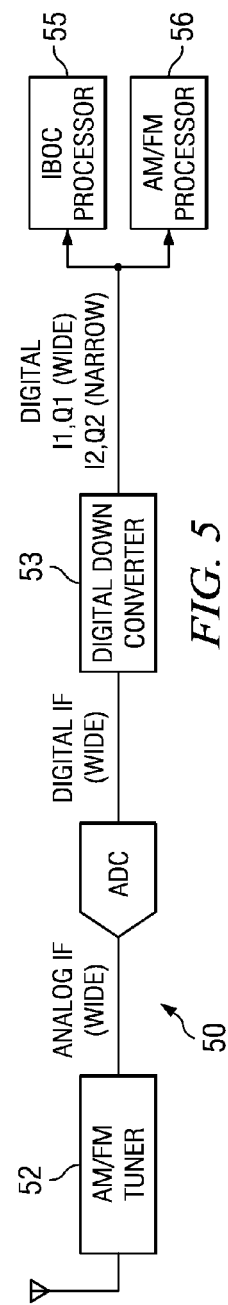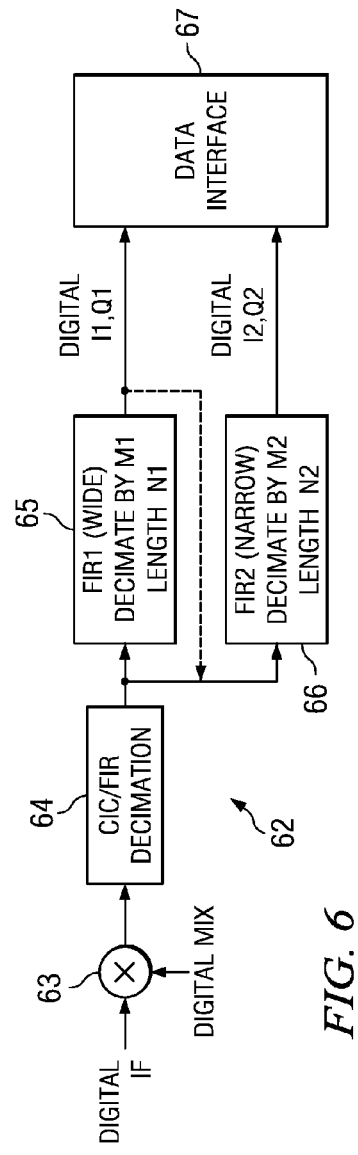

DIGITAL RADIO FRONT END WITH MINIMIZED IF SIGNAL PATH

CROSS REFERENCE TO RELATED APPLICATIONS

The present application is based on and claims the benefit of U.S. Provisional Patent Application No. 60/555,506, filed on Mar. 23, 2004, entitled "Digital Radio Front End With Minimized IF Signal Path," to which a claim of priority is hereby made and which is hereby incorporated in its entirety herein by reference.

STATEMENT REGARDING FEDERALLY SPONSORED RESEARCH OR DEVELOPMENT

N/A

BACKGROUND OF THE INVENTION

1. Field of the Invention

The present invention relates generally to multiple band radio receivers, and relates more specifically to a front end for a digital radio that can tune in digital and analog signals.

2. Description of Related Art

New digital radio receivers supporting In Band On Channel (IBOC) or High Definition (HD) Radio, are capable of detecting, tracking, and processing a digital broadcast signal in addition to the traditional analog signal for any given channel. FIG. 7 illustrates a hybrid IBOC signal with different bands related to digital and analog radio signals. The spectral location of IBOC digital subcarriers drives a new requirement for wide intermediate frequency (IF) filters, allowing the wider band signal to be properly passed for detection and decoding. The different requirement for IF filters present new challenges to the radio front end design since the analog signal is typically filtered in the tuner using a narrow IF filter, while a wide IF filter is used to pass a digital signal located on the same AM/FM channel.

To receive both analog and digital signals in a hybrid IBOC signal, today's radio front end designs have changed in a couple key ways. First the tuner has changed in terms of IF signal filtering. FIG. 1 shows a typical AM/FM tuner architecture. Filter boxes 12, 13 represent tuner areas that have been affected by new HD Radio requirements. FIG. 2 shows IF filter configurations 22-26 that can be used to provide narrow IF filtering for traditional AM/FM and wide filtering for IBOC. FIG. 2 illustrates general system designs representative of a number of the types of configurations that can be used. The combination of filters and control switches typically adds complexity and cost to the tuner.

The second major change to radio front end designs is related to the IF signal path. previously a single IF signal path was adequate for AM/FM signal processing. With the increased operability posed by HD Radio for signal detection and decoding, an additional path is used to accommodate a wide IF signal path in addition to the conventional narrow IF signal path. The implementation of multiple IF paths can be accomplished in several ways, including multiplexing signal paths so that one IF signal is output from the tuner, or providing separate wide and narrow IF signals. FIG. 3 shows examples of front end configurations 32, 33 found on HD Radio receivers today.

Present methods attempt to provide a solution at the tuner, through the use of multiple tuners or multiple IF outputs, or through a combination of tuner and host microcontroller interaction where the microcontroller tries to determine when to switch between wide/narrow filters during all modes of operation.

The most typical front end strategies for IBOC receivers today are;

(1) Two tuners, one with narrow IF filters & one with wide IF filters; separate wide IF and narrow IF output paths, and two IF analog/digital converter (ADC) stages for each IF path.

(2) Single tuner with separate wide & narrow IF filters; separate wide IF and narrow IF outputs; two IF ADC stages for each IF path.

(3) single tuner with selectable wide & narrow filters, selected via a programmable switch. The tuner output is a single IF analog signal to an IF ADC. Control is difficult to implement in this strategy, particularly tor FM signals, due to lack of digital information in a narrow filtered (narrow IF) signal. The lack of information poses a problem for the system designer and software engineer, who must use "guessing" methods to determine if a digital signal is available and whether a switch should occur between narrow & wide filters in the tuner. These methods are not always reliable, and the extra control software added to the host microcontroller is undesirable.

Each of the above strategies, illustrated in FIG. 2 as configurations 22-26, has drawbacks, either in terms of cost or complexity in implementation. For example, configurations 24-26 use multiple ADCs, while configurations 22-23 represent additional complexity in switching between wide and narrow filter outputs. In each configuration, the filters operate on the analog IF signal, and provide one or more ADCs on the outputs of the filters. It would be desirable to attain a simplified strategy that minimizes the IF signal path, both in terms of tuner filter stages and number of IF signal outputs from the tuner.

In particular, it would be desirable to obtain a simplified system that is capable of detecting, tracking, and processing a digital broadcast signal in addition to the traditional analog signal for any given channel.

BRIEF SUMMARY OF THE INVENTION

The described invention is a radio front end design that reduces the complexity of existing radio front ends for detecting, tracking, & processing a hybrid HD Radio signal. The invention minimizes the IF signal path design and reduces complexity and cost in the overall system.

In accordance with the present invention, the critical mixing, filtering and decimation is performed by a Digital Down Converter (DDC), before the signal is passed to a DSP for signal processing. The burden of mixing, filtering and decimating the signal to baseband is removed from the tuner. The complex filter requirements for the tuner are also decreased.

The present invention provides a number of advantages, including reduced complexity in the tuner, a single analog IF path, a reduced number of ADCs and more reliable wide and narrow filtering of the IF signal.

BRIEF DESCRIPTION OF THE SEVERAL DRAWINGS

The present invention is described in greater detail below with a reference to the accompanying drawings, in which:

FIG. 4 is a number of block diagrams portions illustrating converter paths;

FIG. 5 is a block diagram of a radio front end in accordance with the present invention;

FIG. 6 is a block diagram portion of a converter in accordance with the present invention.

DETAILED DESCRIPTION OF THE INVENTION

Figure 1:
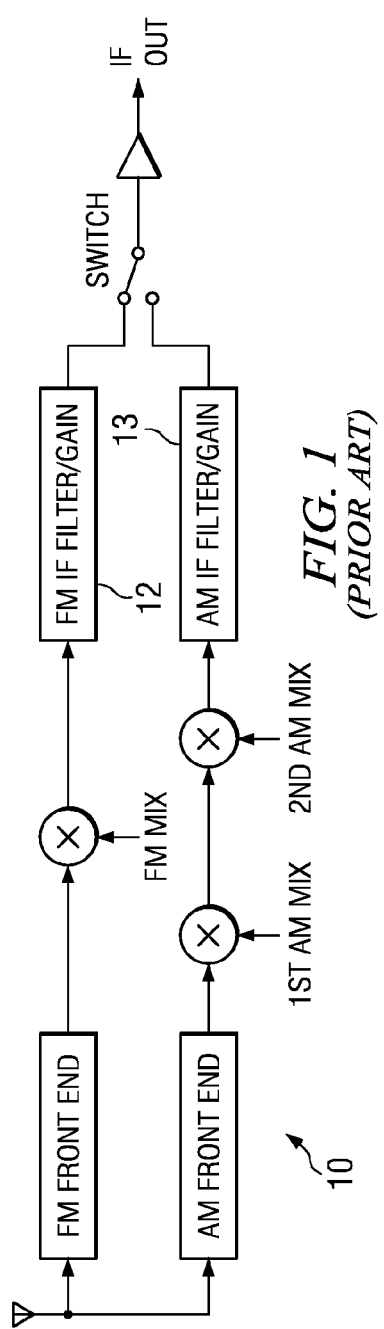
FIG. 1 is a system block diagram of a radio tuner architecture.
Figure 3:
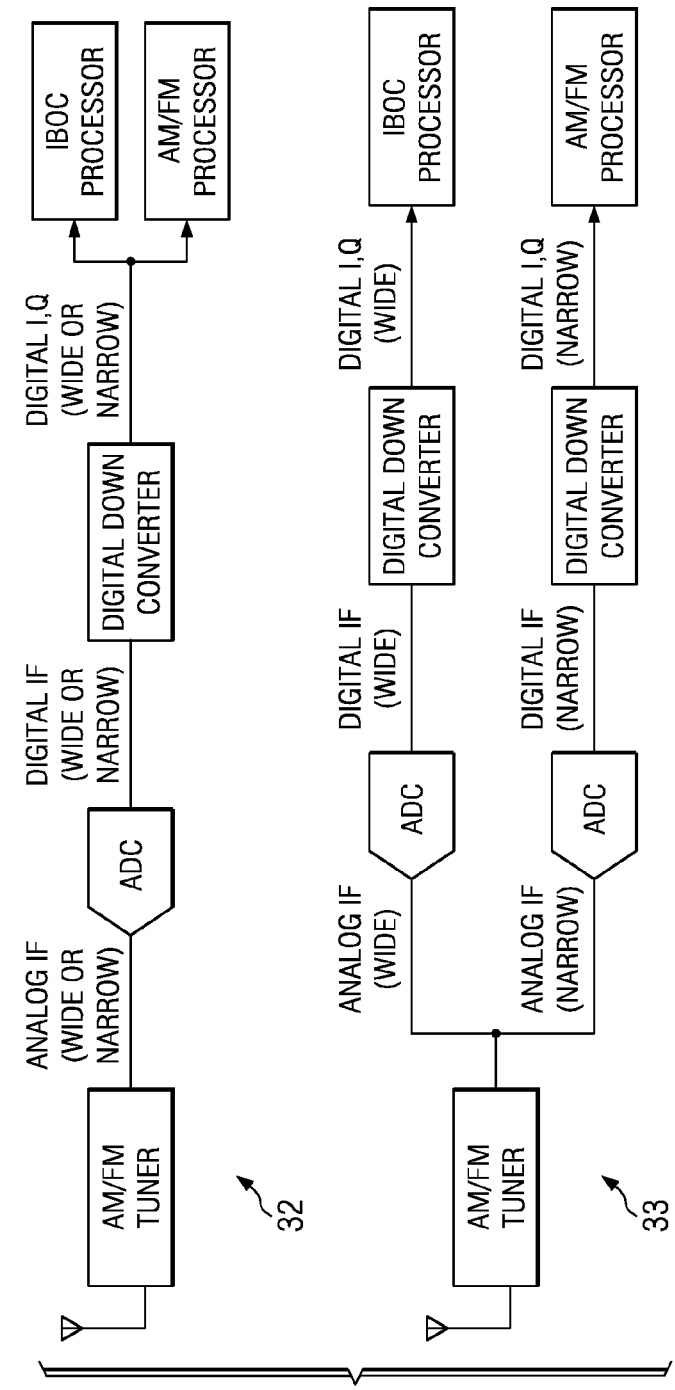
FIG. 3 is a number of block diagrams illustrating radio tuner front ends.
Figure 2:
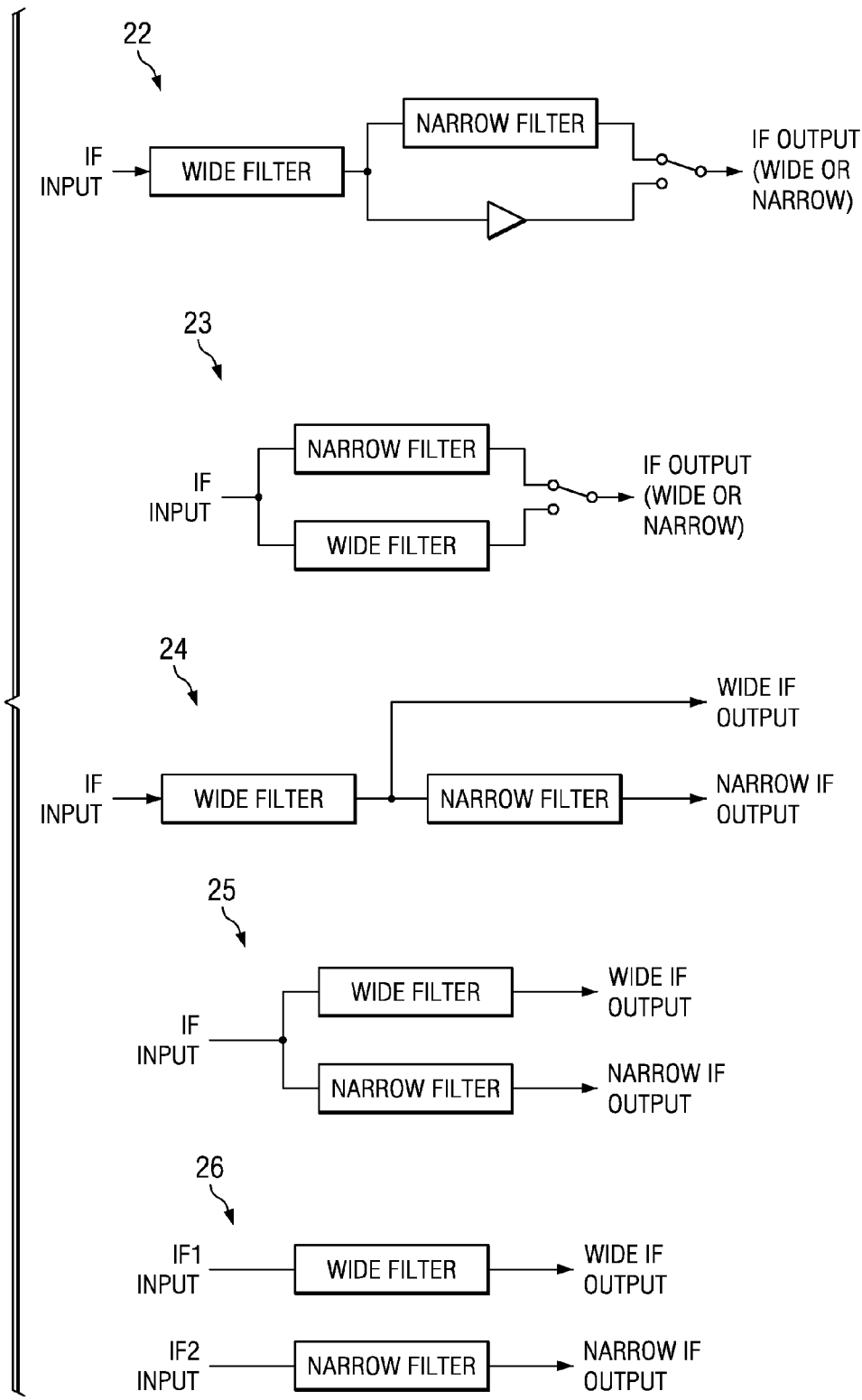
FIG. 2 is a number of abstract system block diagrams for tuners with IF filter configurations.
Figure 7:
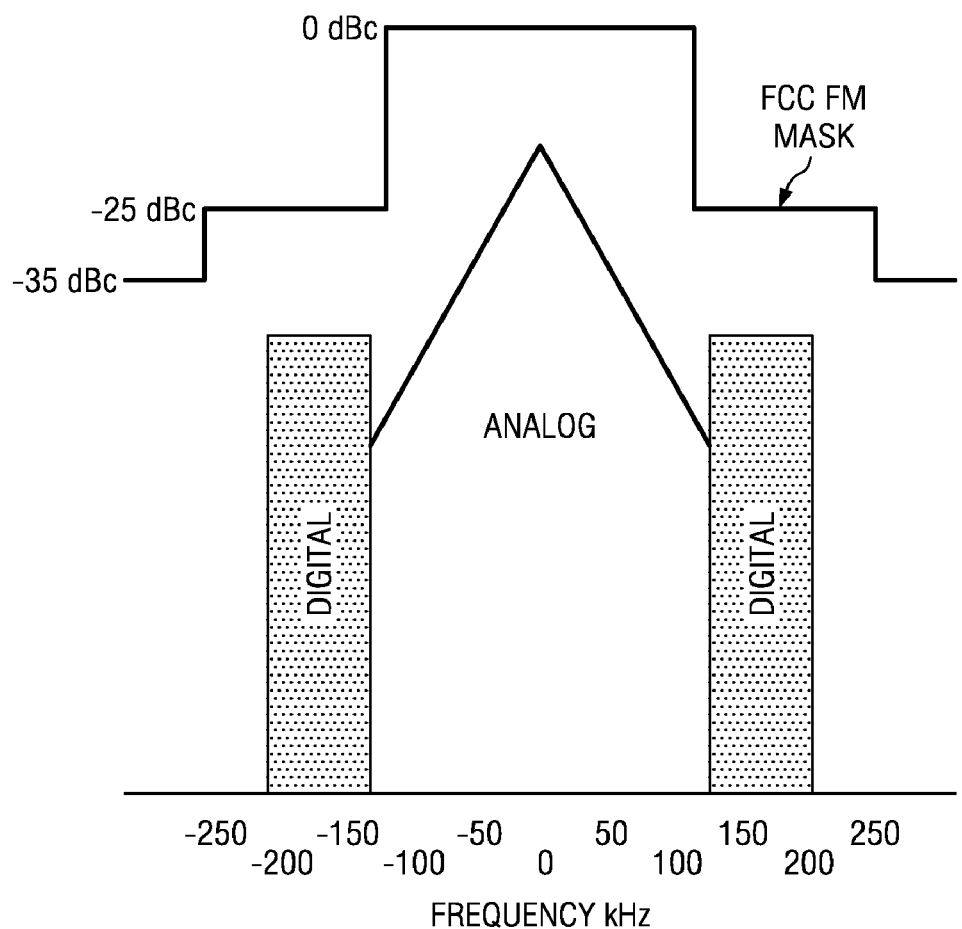
FIG. 7 is a frequency spectrum diagram of a hybrid IBOC signal.

Referring now to FIG. 4, several examples of standard Digital Down Converters (DDCs) 42, 43 are illustrated. In these exemplary embodiments, DCS 42, 43 perform three main functions on the digitized IF signal. First, quadrature mixing generates a digital complex signal consisting of an in-phase portion I and a quadrature-phase portion Q from the digital real IF signal. Second, sample-rate reduction, or decimation, is performed on the I and Q signals using multiple stages of CIC and/or FIR filters. Third, FIR filtering reduces noise from adjacent channels.

In accordance with one aspect of the present invention, DDCs 42, 43 are modified to provide wide and narrow baseband signal information. FIG. 6 shows DDC 62, illustrating an implementation in accordance with the present invention. A single wide IF signal is input into DDC 62 following a tuner output and ADC stage. The digital IF signal is separated into I and Q signals by mixer 63. The output of mixer 63 is decimated by CIC and/or FIR filters in block 64. The final stage of DDC 62 has two unique paths to allow the I and Q signals to pass through two parallel FIR filters 65, 66. One path uses filter 66 to perform narrow filtering to pass the analog baseband I and Q signals to the AM/FM demodulator through data interface 67. The second path uses filter 65 to perform wide filtering to pass the digital baseband component with IBOC subcarriers to the IBOC baseband decoder through data Interface 67.

In filter 65, FIR1 is used as a wideband FIR filter to pass the IBOC signal. FIR1 has N1 taps, and is decimated by a factor of M1. FIR2 is used as a wideband FIR filter to pass the analog component of the AM/FM signal in filter 65. FIR2 has N2 taps, and is decimated by a factor of M2. In an exemplary embodiment, with a system specification for a given ADC resolution, FIR1 and FIR2 are constructed with coefficients of sufficient length to provide enough attenuation in the stopband. N1 and N2 can be the same or different lengths, and are of sufficient lengths to meet desired specifications, such as passband ripple, stopband attenuation, transition bandwidth, and so forth, for both wide and narrow filters 65, 66. For example, N1 and N2 can be smaller for an FM channel with 200 KHZ bandwidth, and are typically larger for smaller channels such as those found in AM bands with a 10 KHz bandwidth. The sample rate frequency and decimation factors, Ml and M2, also contribute to determining the lengths of taps N1 and N2. For FIR2, decimation factor M2 may be larger than decimation factor M1 for FIR1, to permit a lower sample rate for a smaller bandwidth signal to be used.

FIR filters 65, 66 in DDC 62 offer many advantages over the analog filters in the tuner. The ceramic filters found in the tuner have various limitations, including but not limited to: (a) insertion losses of several decibels (dB); passband and stopband characteristics that vary over temperature; (c) non-uniform and non-symmetric responses; (d) limited stopband attenuation, usually in the range of 40 dB to 55 dB depending on the device; and (e) little to no control over passband, transition band, and stopband characteristics. FIR filters 65, 66 improve on all of these drawbacks. FIR filters 65, 66 have characteristics that are easily modified to meet specific design criteria, the passband and stopband attenuation is better, the response symmetry and characteristics do not vary with temperature, and the transition band can be made as narrow or wide as necessary. In addition, it is much easier to implement various filters, including lowpass, highpass, and bandpass, using digital FIR filters.

In accordance with another aspect of the present invention, an exemplary embodiment provides a fixed, wide IF filter in the tuner. The accurate FIR filtering in DDC 62 results in relaxed specifications for the analog IF tuner filters. A wide IF filter can consequently provide adequate initial filtering of the IF signal in the tuner before the IF signal reaches the more precise filtering stages in DDC 62. The relaxed specifications for the tuner permit the elimination of narrow IF tuner filters as well as any switches used to control the narrow IF tuner filters. Another significant result of the filtering in DDC 62 is the reduction of tuner outputs. A single tuner IF output is used in this exemplary embodiment with a wide IF filter. Another advantage provided by the present invention is simplified control of the tuner. A host microcontroller and system need not control switching between wide and narrow filters in order to provide appropriate filtering for both analog and digital components of the broadcast signal.

Referring to FIG. 5, diagram 50 shows an entire front end system with wide IF filters in tuner 52, a single IF path, and a modified DDC 53 for generating wide and narrow baseband signals. The wide and narrow baseband signals are provided to a data interface for conditioning and/or distribution to IBOC processor 55 and AM/FM processor 56.

The present invention thus provides a number of advantageous results. A single tuner with a single analog IF output is sufficient to meet the needs of the application. The number of filters in the tuner is reduced, as is the number of switches used to switch between narrow and wide IF filters. The invention permits the front end to operate with a single IF ADC. The combination of reduced IF paths and number of ADC's saves board space, leading to savings in both cost and PCB design efficiency. The digital FIR filters in DDC 53 have better characteristics and are more reliable than the ceramic-type narrow & wide tuner filters. DDC 62 provides two sets of digital baseband I and Q signal outputs that allow complete detection, tracking, and processing of both analog and digital components in a hybrid IBOC signal. Finally, host microcontroller control of the tuner is minimized.

Although the present invention has been described in relation to particular embodiments thereof, other variations and modifications and other uses will become apparent to those skilled in the art from the description. It is intended therefore, that the present invention not be limited not by the specific disclosure herein, but to be given the full scope indicated by the appended claims.

What is claimed is:

1. A digital down converter (DDC) of an integrated circuit capable of receiving In Band On Channel (IBOC) signal, the DDC comprising:
    a wide band digital filter for receiving the digital IF signal and providing a wide band signal output related to a digital baseband output; and
    a narrow band digital filter in the DDC for receiving the digital IF signal and providing narrow band signal output related to an analog baseband output;
    wherein the DDC receives an IBOC signal and outputs an isolated hybrid analog signal.

2. The DDC according to claim 1, wherein the filters are FIR filters.

3. The DDC according to claim 2, wherein the FIR filters have coefficients with a bit length sufficient to provide one or more of adequate signal to noise ratio or dynamic range.

4. The front end according to claim 3, wherein the coefficient bit length is 16 or more bits.

5. The DDC according to claim 1, further comprising a wide IF filter in a front end AM/FM tuner.

6. The DDC according to claim 1, further comprising a front end AM/FM tuner with a single IF output.

7. The DDC according to claim 1, wherein the DDC further comprises a mixer operable to perform quadrature mixing to generate I and Q signals from an input digital IF signal.

8. The front end according to claim 1, wherein the wide or narrow band filter produces respective wide or narrow in-phase and quadrature signals.

9. The front end according to claim 1, wherein the wide or narrow band filter produces in-phase and quadrature baseband signals.

10. The front end according to claim 1, further comprising a single ADC between a tuner and the DDC to convert an IF tuner output signal to the digital IF signal.

11. A method for generating isolated hybrid analog signal from an In Band On Channel (IBOC) signal, comprising:
    mixing the digital IF signal to produce baseband in-phase (I) and quadrature-phase (Q) signals;
    filtering the I and Q signals with a wide band filter to produce wideband I and Q signals;
    filtering the I and Q signals with a narrow band filter to produce narrow band I and Q signals related to an isolated hybrid analog signal.

12. The method according to claim 11, further comprising providing FIR filters as the wide band and narrow band filters.

13. The method according to claim 11, further comprising providing a wide band IF filter in a tuner of the HD radio receiver.

14. The method according to claim 11, further comprising providing a single tuner output from the tuner in the RD radio receiver.

15. The method according to claim 11, further comprising providing a single ADC between a tuner and a DDC to convert an IF tuner output signal to a digital IF signal.

16. A digital down converter for use in an HD radio receiver, comprising:
    a mixer for mixing a digital IF signal to produce baseband I and Q signals;
    a wide band filter for receiving the baseband I and Q signals and producing wide band filtered I and Q signals; and
    a narrow band filter for receiving the baseband I and Q signals and providing narrow band filtered I and Q signals related to an isolated hybrid analog signal; and
    wherein the DDC receives an In Band On Channel (IBOC) signal to produce the isolated hybrid analog signal.

17. The DDC according to claim 16, further comprising a decimator interposed between the digital mixer and the wide band and narrow band filters for providing a decimated signal to the filters.

18. The DDC according to claim 16, wherein the wide band and narrow band filters are FIR filters.

19. The DDC according to claim 16, wherein the DDC receives a single digital IF signal, and produces two separate digital signals, each having an I and Q signal.

* * * * *